United States Patent [19]

Jagadish et al.

[11] Patent Number: 5,768,415

[45] Date of Patent: Jun. 16, 1998

[54] APPARATUS AND METHODS FOR PERFORMING ELECTRONIC SCENE ANALYSIS AND ENHANCEMENT

[75] Inventors: Hosagrahar Visvesvaraya Jagadish, Berkeley Heights; Eric David Petajan, Watchung, both of N.J.

[73] Assignee: Lucent Technologies Inc., Murray Hill, N.J.

[21] Appl. No.: 525,932

[22] Filed: Sep. 8, 1995

[51] Int. Cl.[6] .................................................. G06K 9/00
[52] U.S. Cl. ........................... 382/154; 348/578; 345/419
[58] Field of Search ..................................... 382/154, 285, 382/284, 294; 395/121, 122, 127, 125; 348/42, 43, 46, 578, 580; 345/452, 139, 419

[56] References Cited

U.S. PATENT DOCUMENTS

| | | | |
|---|---|---|---|
| 5,101,268 | 3/1992 | Ohba | 348/43 |
| 5,299,298 | 3/1994 | Elmquist et al. | 395/121 |
| 5,534,917 | 7/1996 | MacDougall | 348/578 |
| 5,555,324 | 9/1996 | Waxman et al. | 382/254 |
| 5,577,175 | 11/1996 | Naka et al. | 395/127 |
| 5,606,627 | 2/1997 | Kuo | 382/154 |

*Primary Examiner*—Leo Boudreau
*Assistant Examiner*—Bhavesh Mehta

[57] ABSTRACT

Apparatus and methods are provided for analyzing and enhancing a received data signal representing one or more views of a captured scene. The received data signal includes a plurality of data points. Each view includes a plurality of image points. Ones of the plurality of data points are representative of ones of the plurality of image points. A plurality of data sets are identified wherein each one of the data sets includes ones of the plurality of data points. Ones of the identified data sets are compared with one or more standard values and, in response thereto, are enhanced selectively to generate an output signal representing a processed 3-D scene estimate.

27 Claims, 8 Drawing Sheets

APPARATUS AND METHODS FOR PERFORMING ELECTRONIC SCENE ANALYSIS AND ENHANCEMENT

TECHNICAL FIELD OF THE INVENTION

The present invention relates generally to video data capture, processing and display, and in particular to apparatus and methods for performing electronic scene analysis and enhancement.

BACKGROUND OF THE INVENTION

A conventional video camera is in many respects similar to a human eye. The eye, for example, adjusts its focus and the amount of light it receives by means of muscles that surround and control the eye's lens and iris. This is analogous to a camera's aperture, shutter speed and focus. Both the camera and the eye "see" by taking many quick snapshots, typically on a frame-by-frame basis. Each snapshot being a single picture frame made up of many picture elements ("pixels").

To explore a particular scene, the eye moves to capture different views of it. A scene is a set of physical objects or substances which make up an environment including without limitation, light sources, people, liquids, atmosphere, automobiles, buildings, and the like.

In exploring the scene, the eye identifies which, if any, of the objects within the scene are in motion relative to one another or relative to a given point of view. A point of view is typically specified by three dimensional ("3-D") location and orientation. Eye movements therefore are cooperative actions between the eye and the brain which enable humans to perceive their surroundings in 3-D.

The human retina, which is attached to the back of the eye, connects the eye and brain together. The retina contains approximately a hundred million receptors which operate to receive the aforementioned pixels. When a scene is received by the retina, the brain also receives general information about the view of the particular scene, such as data relating to the size, shape, orientation, range of depth, texture and the like of objects in the scene. Range of depth typically means the relative distance from the eye, or camera, to one or more of the particular objects perceived.

Conventional video applications are typically unable to process received video signals and generate aesthetically pleasing 3-D scene estimates which meet human perceptual quality. Those applications which nonetheless attempt 3-D scene generation typically use stereo image correspondence. Stereo image correspondence is a conventional technique used to roughly estimate the 3-D position of each visible surface point within the scene. These applications often fail to refine 3-D surface shapes and texture estimates, and accordingly also fail to generate 3-D image structures that are both pleasing aesthetically and meet human perceptual quality. These shortcomings remain a dominant obstacle to producing more commercially successful 3-D products.

SUMMARY OF THE INVENTION

Broadly, the present invention is directed to apparatus and methods for performing electronic scene analysis and enhancement. More particularly, a received input signal representing at least one view of a scene is processed to generate an output signal. The output signal represents an enhanced 3-D scene estimate which is produced utilizing at least one of received or stored scene data. Each enhanced scene estimate typically includes one or more foreground and/or background objects.

Stored scene data may include for example data for identifying foreground and/or background objects; data for computing one or more error values with respect to any identified object; scene information data for reducing the computed error values; visual significance data for determining the importance of each identified object; visual masking data; and/or the like. By comparison, received scene data may include for example positional data describing one or more relationships among two or more foreground and/or background objects, such as, size, shape, orientation, range of depth, texture data, and/or the like. An important aspect of the present invention, as will become apparent momentarily, is the selective utilization of the stored and/or received scene data to generate a 3-D scene estimate in a manner which conserves processing resources.

An apparatus in accordance with the principles of the present invention generates an output signal representing an enhanced 3-D scene estimate, and includes receiving and processing means. The receiving means operates to receive an input signal. The input signal represents at least one view of a scene, wherein the view includes a plurality of image points and the input signal includes a plurality of data points. Ones of the plurality of data points preferably represent ones of the plurality of image points. The processing means operates to identify a plurality of data sets wherein each one of the data sets includes ones of the data points, to rank particular ones of the identified data sets, and in response to this ranking, to enhance selectively ones of the identified data sets to generate the output signal representative of the enhanced 3-D scene estimate. An important aspect of any apparatus in accordance with the principles of the present invention is that it may be processing system, firmware or hardware based.

A method in accordance with the principles of the present invention concerns the processing and enhancement of a received input signal to generate an output signal representing an enhanced 3-D scene estimate. The method preferably includes the steps of receiving, identifying, ranking and enhancing. More particularly, at least one input signal is received which represents a view of a scene. Each view includes a plurality of image points and each input signal includes a plurality of data points. Ones of the data points are preferably representative of ones of the image points. A plurality of data sets are identified wherein each one of the data sets includes ones of the data points. Ones of the identified data sets are ranked using stored scene and importance information and an error value is generated. The error value represents the probability that the data set correctly represents the actual scene. In response to this ranking and error generation, particular ones of the identified data sets are enhanced selectively to generate the output signal. The output signal represents the enhanced 3-D scene estimate.

One preferred embodiment for using and/or distributing the present invention is as software. The software embodiment includes a plurality of processing system instructions which are stored to a storage medium. Preferred storage media may be magnetic, optical, or semiconductor based, as well as include suitably arranged combinations thereof. The processing system instructions are readable and executable by a processing system, and upon execution, operate to control at least one processing system for performing electronic scene analysis and enhancement in accordance with the principles of the present invention.

BRIEF DESCRIPTION OF THE DRAWINGS

For a more complete understanding of the present invention, and the advantages thereof, reference is now made to the following Detailed Description of the Invention, taken in conjunction with the accompanying drawings in which like numbers designate like parts, and in which.

DETAILED DESCRIPTION OF THE INVENTION

Figure 1A:
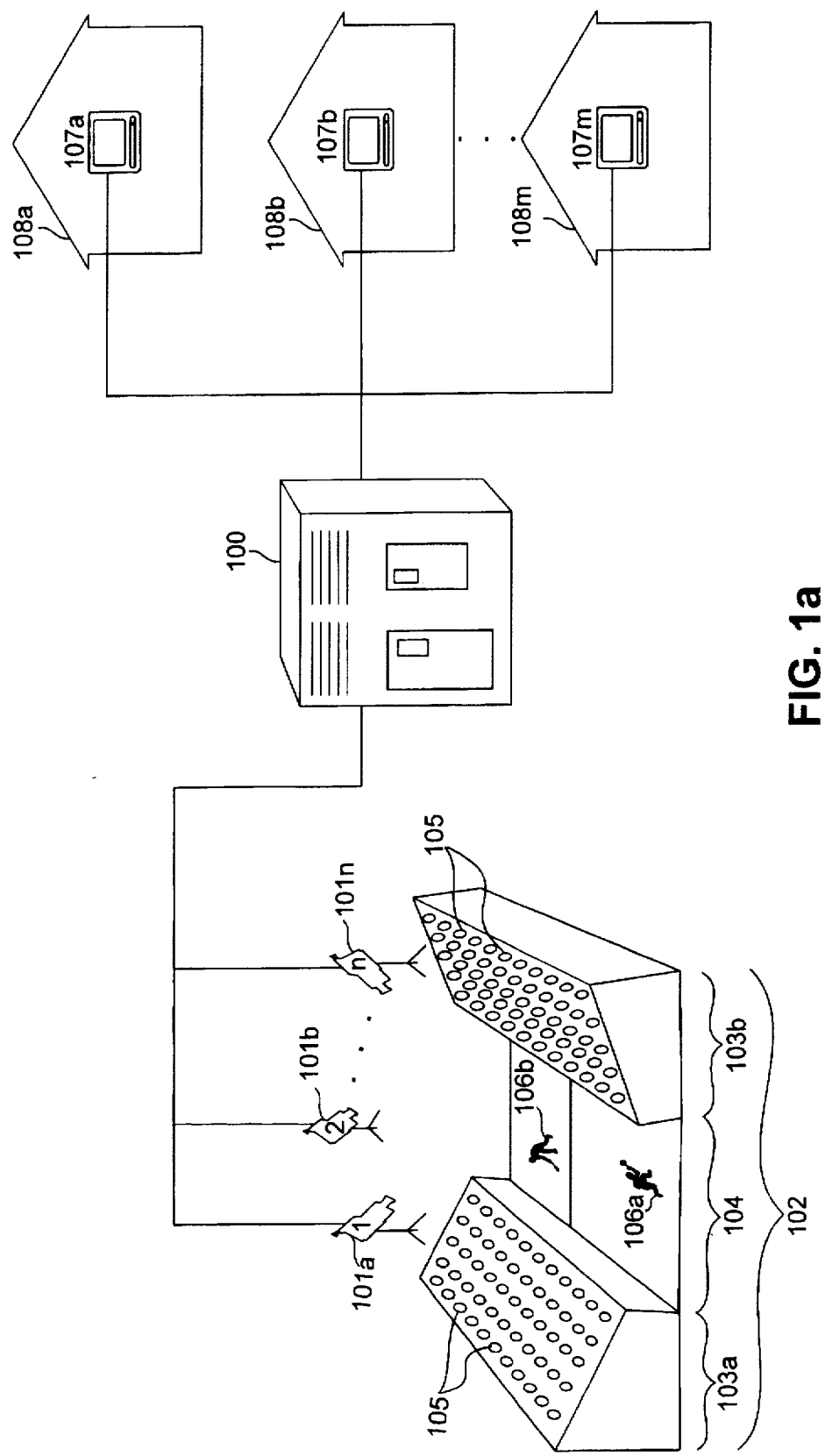
FIG. 1a illustrates a block diagram of an exemplary processing system-based video system for performing electronic image analysis and enhancement in accordance with the principles of the present invention.

FIG. 1a illustrates a block diagram of an exemplary processing system-based video system in which the principles of the present invention are particularly advantageous. The exemplary system includes a single processing system 100, illustrated as a main frame computer, coupled with a plurality of conventional video cameras 101a–101n. Processing system 100 is operative to receive one or more input data signals from one or more of the video cameras 101a–101n. Each received input signal is a real physical signal that represents a view of a captured video or photographic scene. A conventional video signal typically includes video data representing the captured scene together with blanking and synchronization control. In accordance with an alternate embodiment, only a single camera is used wherein an exemplary input signal may suitably be arranged to provide additional information for use in estimating the 3-D position within the scene. This information may include, without limitation, information concerning the size of the camera's aperture, the focal length of its lens, and/or the like.

It should be noted that although a single main frame computer is shown, implementation of a processing system-based scene analysis and enhancement system in accordance with the present invention may utilize any suitably arranged processing system, including a network combination thereof. Alternate non-processing system-based embodiments also may suitably be implemented in firmware or hardware. Aspects of the foregoing implementations will be discussed in greater detail with reference to FIGS. 2 and 3.

Video cameras 101a–101n are suitably positioned about a tennis stadium 102. Tennis stadium 102 includes two grandstands 103a, 103b and a court 104. Each of the grandstands 103a, 103b includes a plurality of seats, many of which will be occupied by spectators 105 during a tennis match, as illustrated. The court 104 is shown to include two opposing tennis players 106a, 106b.

One or more of the video cameras 101a–101n operate to capture views of the tennis match from which representative video data signals are produced. The produced signals are input to processing system 100 wherein they are analyzed and enhanced in accordance with the principles of the present invention to produce an estimated 3-D scene from which an arbitrary view of the 3-D scene may suitably be extracted and transmitted to a plurality of suitably arranged televisions 107a–107m. In alternate embodiments, the estimated 3-D scene may suitably be utilized in conjunction with 3-D viewing apparatus such as stereoscopic technologies, including without limitation virtual reality systems and methodologies.

It should be further noted that although processing system 100 is physically coupled to both video cameras 101a–101n and televisions 107a–107m, processing system 100 may suitably be arranged to facilitate wireless communication as well.

Figure 1B:
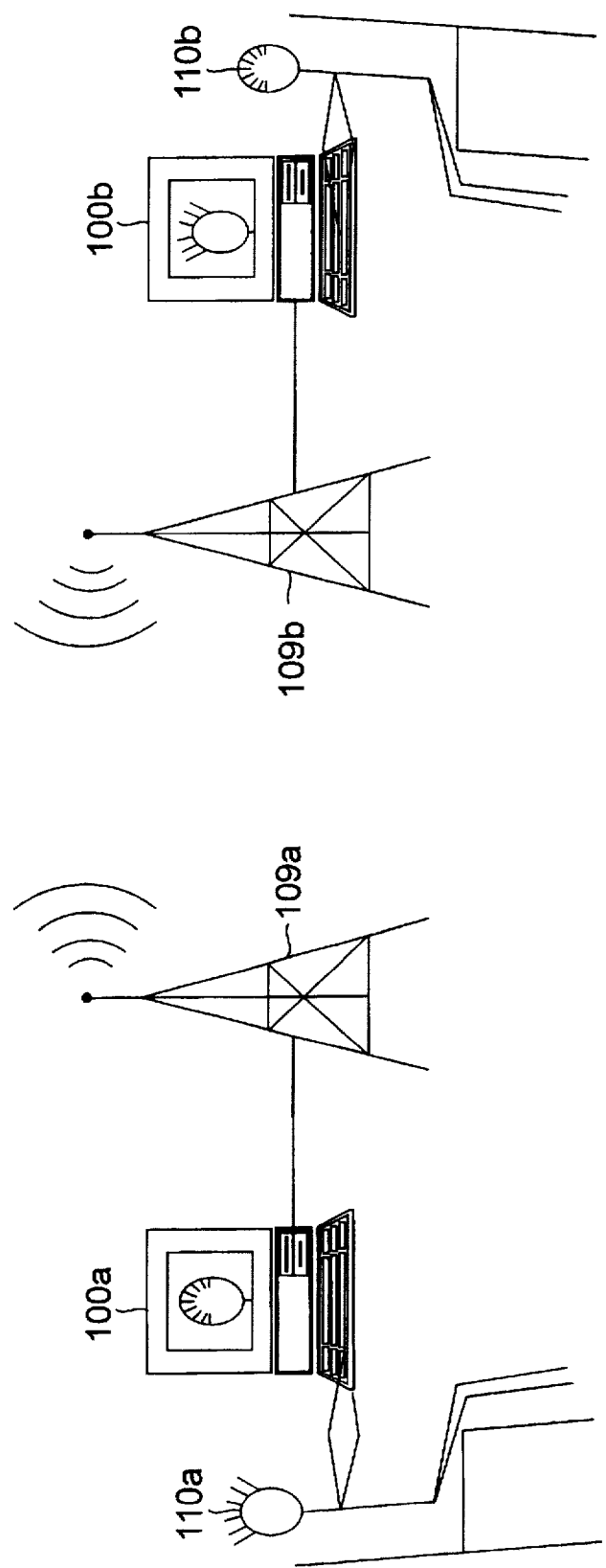
FIG. 1b illustrates a block diagram of an exemplary processing system-based wireless local area network which includes videophone technologies.

Turning to FIG. 1b for example, there is illustrated a block diagram of an exemplary processing system-based wireless local area network ("LAN") in which the principles of the present invention are also particularly advantageous. The illustrated LAN includes two exemplary processing system nodes 100a, 100b, shown as personal computers.

Each of the processing system nodes 100a, 100b is coupled with a conventional antenna 109a, 109b, respectively, and includes conventional videophone technologies (not shown). Antennas 109a, 109b operate to transmit and receive wireless communications between at least two processing system nodes 100a, 100b. Received wireless communications are processed utilizing representative electric signals. The illustrated LAN facilitates communications between users A and B, 110a, 110b, respectively, wherein each processing system node is operative to transmit, receive and process video data signals in accordance with the principles of the present invention. Each of the processed signals are again real physical signals which represent a 3-D scene estimate.

Figure 2:
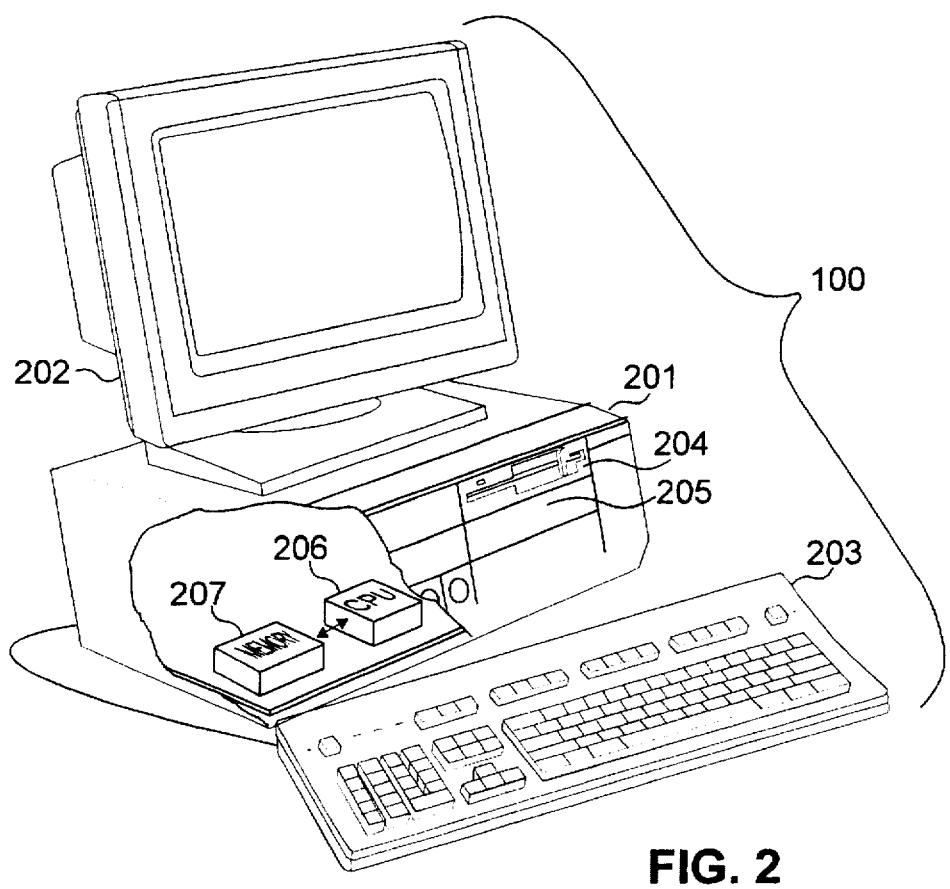
FIG. 2 illustrates an isometric view of one exemplary processing system which may be programmed to analyze and enhance a received video signal in accordance with the principles of the present invention.

FIG. 2 illustrates an isometric view of an exemplary processing system, personal computer 100, that may suitably be programmed to analyze and enhance one or more received video signals in accordance with the principles of the present invention. As previously introduced, a preferred exemplary embodiment for using and/or distributing the present invention is as software. The software preferably includes a plurality of processing system instructions for controlling at least one processing system, such as personal computer 100, to perform scene analysis and enhancement.

Personal computer 100 includes a housing 201, a monitor 202 and a keyboard 203. Monitor 202 and keyboard 203 may be replaced by, or combined with, other suitably arranged output and input devices, respectively. Housing 201 is illustrated having a cutaway view, and includes both a floppy disk drive 204 and a hard disk drive 205. Floppy disk drive 204 is operative to receive, read and write to external disks. Floppy disk drive 204 may be replaced by or combined with any suitably arranged structure for receiving and transmitting data, including without limitation tape and compact disc drives, telephony systems and technologies, including videophone, paging and facsimile devices, and serial and parallel data ports. Hard disk drive 205 is operative to provide fast access data storage and retrieval. It should be noted that video data may suitably be received via one of the exemplary input ports, or alternatively, via one or more separate storage devices, such as, a floppy disk or a compact disc, for example. An important aspect of the exemplary embodiment therefore is that data collection, analysis and enhancement need not occur coincidentally.

A processing unit 206 is illustrated within the cut away portion of housing 201. Processing unit 206 is suitably coupled with a memory storage device 207. Memory storage device 207 may be any conventional suitably arranged memory storage device, including without limitation random access memory ("RAM"), read only memory ("ROM"), and the like. In alternate embodiments, personal computer 100 may suitably be equipped with a plurality of processing units and/or suitably arranged memory storage devices, or combination thereof, to cooperatively carry out the principles of the present invention.

Personal computer 100 is therefore utilized to illustrate one exemplary embodiment of a processing system-based implementation of the present invention. The principles of the present invention may be implemented in any processing system having at least one processing unit and a means for receiving video data, including without limitation cameras, videophones, televisions, sophisticated calculators and, hand-held, lap-top/notebook, mini, main frame and super computers, including RISC and parallel processing architectures, as well as within processing system network combinations of the foregoing. Conventional processing system architecture is more fully discussed in *Computer Organization and Architecture*, by William Stallings, MacMillan Publishing Co. (3rd ed. 1993), which is incorporated herein by reference.

Other preferred exemplary embodiments may suitably be implemented in firmware or hardware, including without limitation suitably arranged programmable logic devices, like PALs (programmable array logic) and PLAs (programmable logic arrays), DSPs (digital signal processors), FPGAs (field programmable gate arrays), ASICs (application specific integrated circuits), VLSIs (very large scale integrated circuits), and the like.

Figure 3:
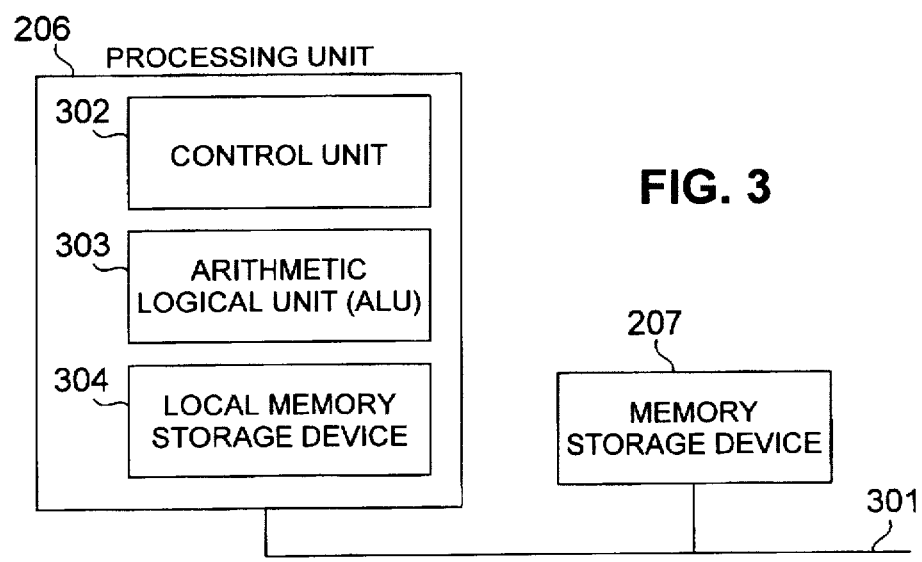
FIG. 3 illustrates a block diagram of one illustrative microprocessing system which may be utilized in conjunction with the exemplary processing system of FIG. 2.

FIG. 3 illustrates a block diagram of an illustrative microprocessing system which may be utilized in conjunction with personal computer 100. The microprocessing system includes a single processing unit 206 coupled via data bus 301 with a single memory storage device 207. Memory storage device 207 is operative to store one or more instructions and/or data. Processing unit 206 is operative to retrieve and execute the stored instructions. Exemplary processing unit 206 includes a control unit 302, an arithmetic logic unit ("ALU") 303, and a local memory storage device 304, such as, stackable cache or a plurality of registers, for example. Control unit 302 is operative to fetch instructions from memory storage device 207. ALU 303 is operative to perform a plurality of operations, including without limitation addition and Boolean AND, needed to carry out those instructions. Local memory storage device 304 is operative to provide local high speed storage used for storing temporary results and control information.

Figure 4:
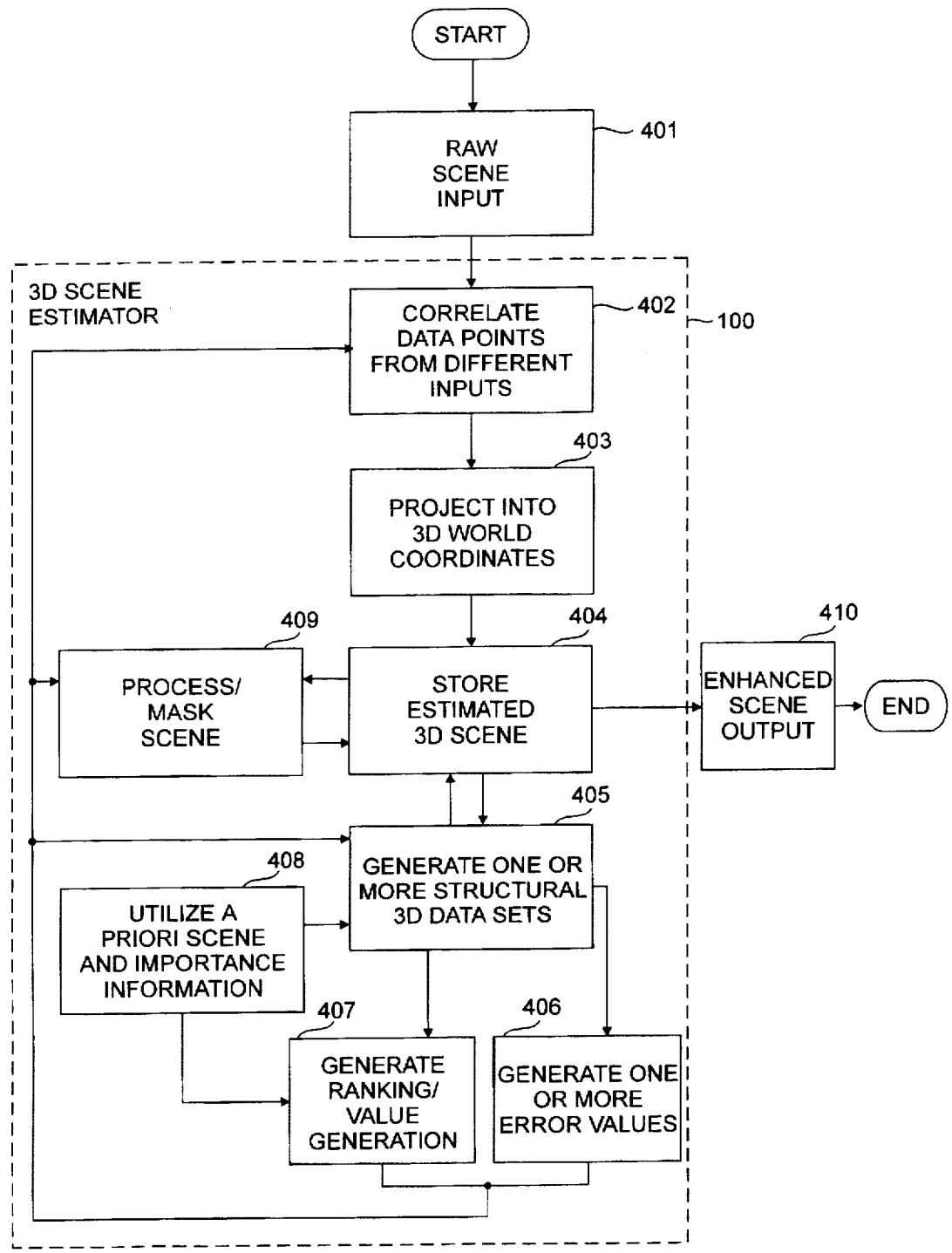
FIG. 4 illustrates a flow diagram of one exemplary method for performing electronic scene analysis and enhancement in accordance with the principles of the present invention.

FIG. 4 illustrates a flow diagram of one exemplary method for performing scene analysis and enhancement in accordance with the principles of the present invention. As has been illustrated in FIGS. 1a and 1b, one or more processing systems 100 are operative to receive at least one video signal representing a view of a scene, input block 401. Recall that the scene may suitably be captured by one or more conventional video capturing devices, such as any of the video cameras 101a–101n, of FIG. 1a for example. If a single camera is used to capture a particular scene, additional information must be supplied to the processing system that enables the extraction of necessary 3-D position information. This information may include for example the focal length and/or aperture of one or more lenses of the camera and/or the camera's shutter speed.

Figure 5A:
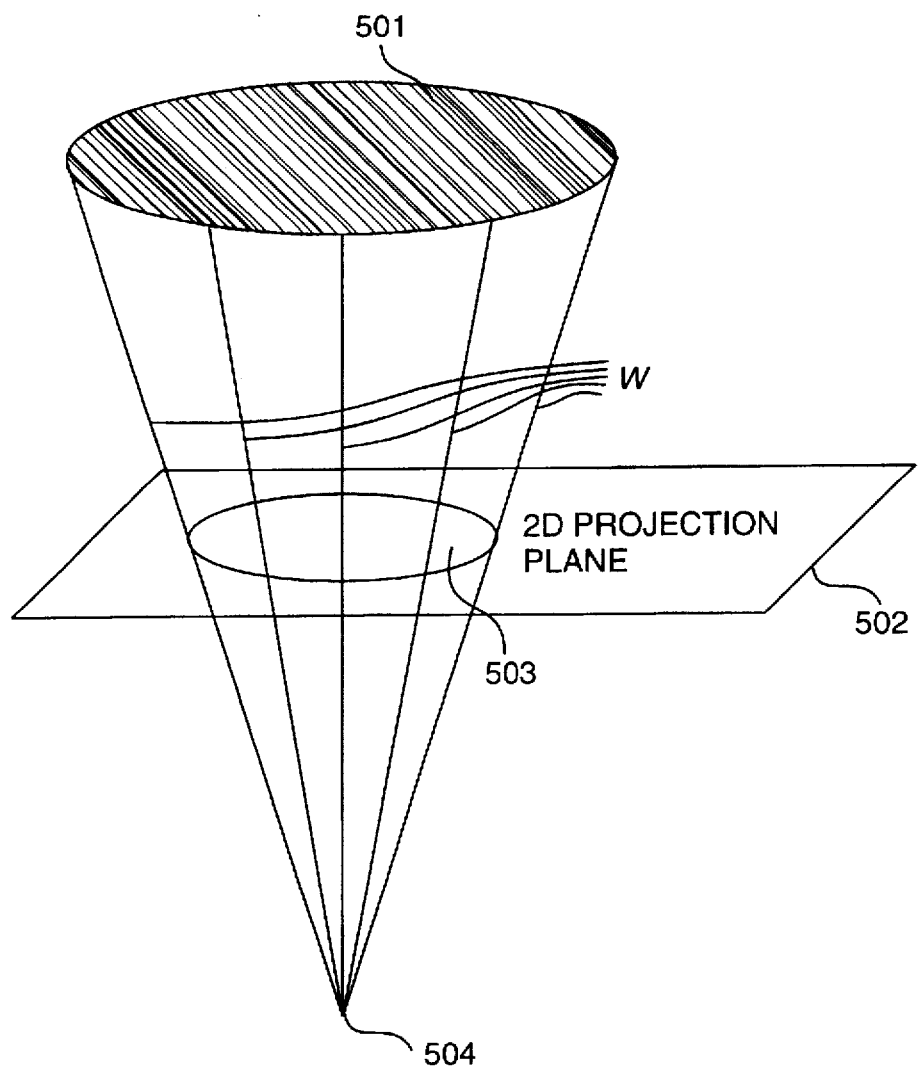
FIG. 5a illustrates a frustum wherein a 3 dimensional object is projected onto a 2 dimensional plane.

Each received video signal includes a plurality of data points. Each view of a scene includes a plurality of image points. In accordance with the illustrated embodiment particular ones of the data points are representative of particular ones of the image points. Processing system 100 operates to correlate the received data points from the one or more video capturing devices, process block 402. More particularly, each view of a scene, as obtained by one or more cameras, represents the projection of a plurality of 3-D points within the scene to a 2-D image projection plane. All lines that are formed by connecting a given 3-D point with its corresponding 2-D projection plane point intersect at a common center of projection. FIG. 5a illustrates a frustum wherein a 3-D object 501 is projected onto a 2-D plane 502. Projection plane 502 includes a 2-D object image 503. All lines, w, mentioned, converge to a center of projection 504. Each view therefore includes a plurality of image points and each input data signal includes a plurality of data points.

Figure 5B:
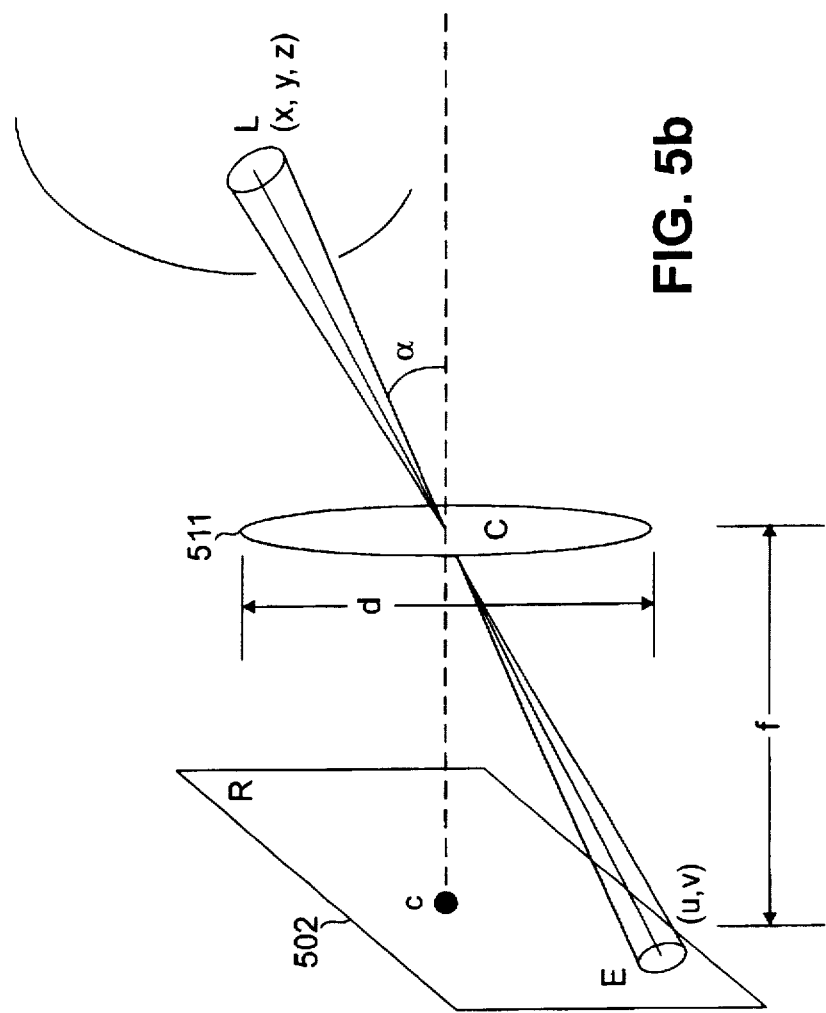
FIG. 5b illustrates a linear relationship between image irradiance and scene radiance.

Turning to FIG. 5b, there is illustrated a linear relationship between image irradiance and scene radiance, and more particularly, between an image point (u, v) on a 2-D projection plane 502 and a 3-D point within a particular scene (x, y, z) given a focal length, f. Assuming the existence of a pinhole camera model 511, the relationship between image irradiance and scene radiance may be given generally by:

$$E = L \frac{\pi}{4} \left( \frac{d}{f} \right)^2 \cos^4 \alpha,$$

wherein E is the image irradiance, L is the scene radiance, f is the focal length (i.e., distance between a pinhole and an image plane), d is the diameter of pinhole 511, and $\alpha$ is the angle between the normal and a line formed between a given object point and a given image point.

A typical relationship between image coordinates and 3-D space coordinates may suitably be expressed as follows:

$$-\frac{f}{z} = \frac{u}{x} = \frac{v}{y}.$$

The foregoing may also be rewritten linearly as:

$$\begin{bmatrix} U \\ V \\ S \end{bmatrix} = \begin{bmatrix} -f & 0 & 0 & 0 \\ 0 & -f & 0 & 0 \\ 0 & 0 & 1 & 0 \end{bmatrix} \begin{bmatrix} x \\ y \\ z \\ 1 \end{bmatrix},$$

wherein u=U/S and v=V/S, wherein S≠0.

Processing system 100 operates to project the correlated data points into 3-D world coordinates, process block 403. In accordance with the illustrated embodiment, a 3-D scene estimate is created initially using scene information and position data from the one or more video capturing devices in order to correlate the received data points of the one or more captured 2-D views. The correlated data points are projected back into 3-D space.

Figure 5C:
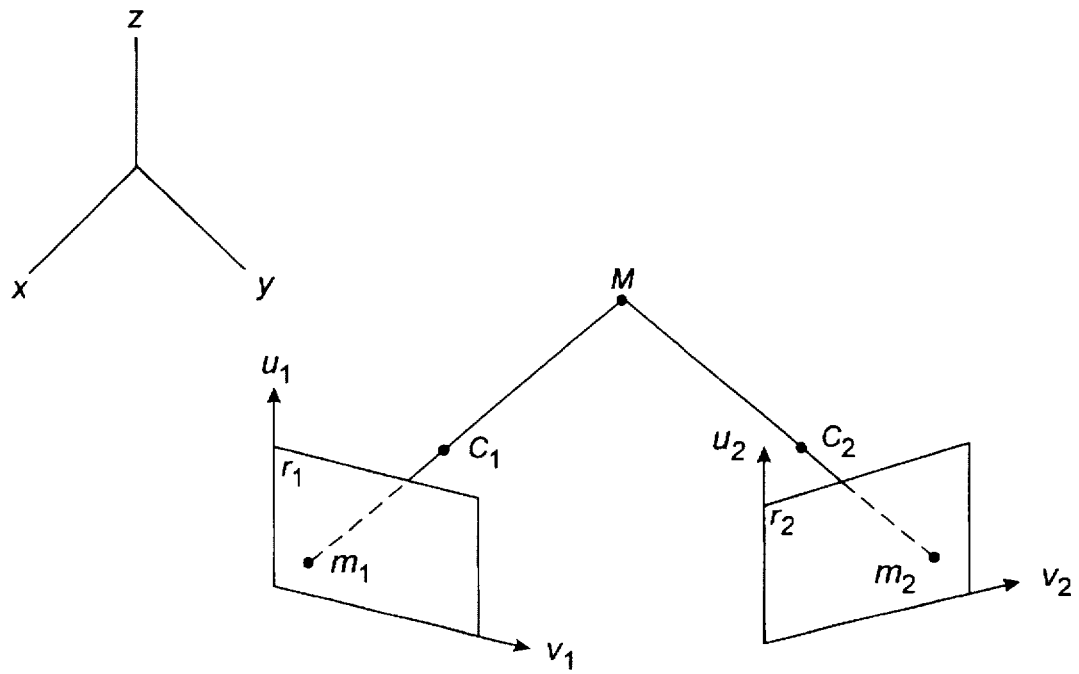
FIG. 5c illustrates idealized 3 dimensional vision wherein first and second pinhole cameras are viewing a single 3 dimensional point.
Figure 5D:
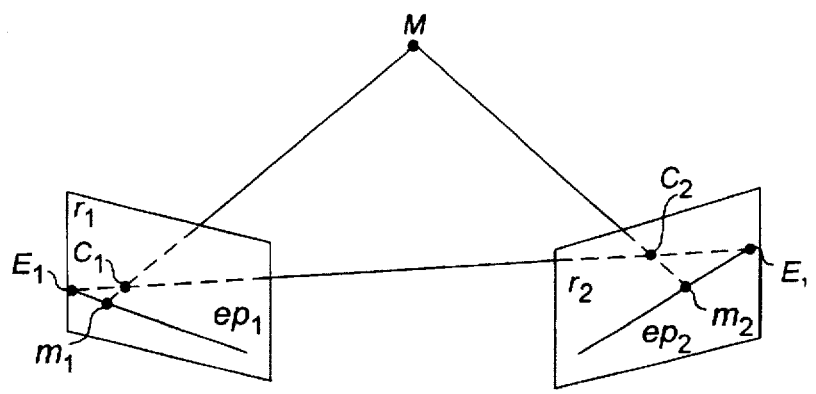
FIG. 5d illustrates an epipolar geometry wherein lines M-$m_1$ and M-$m_2$ are projected through first and second centers of projection, respectively.

FIG. 5c illustrates idealized 3-D vision wherein first and second pinhole cameras view a single 3-D point, M, wherein m1 and m2 are the image points within the two projection planes, $r_1$, and $r_2$, respectively. Turning to FIG. 5d, there is illustrated an epipolar geometry wherein line M-m2 is projected through a first center of projection C1 forming line ep1, and conversely, line M-m1 is projected through a second center of projection C2 forming line ep2. Lines ep1 and ep2 are epipolar lines. Epipolar lines are preferably used when matching to constrain searches during matching.

Figure 5E:
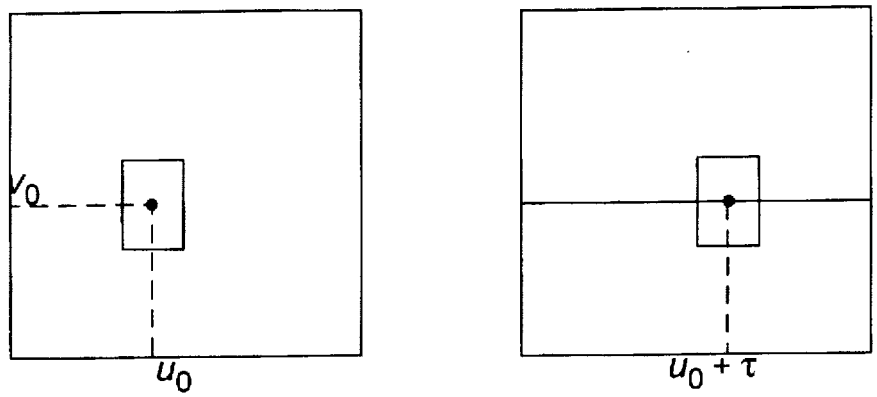
FIG. 5e illustrates an expansion of a 3 dimensional point into a rectangular region wherein $\tau_0$ is a peak correlation position.
Figure 5E:
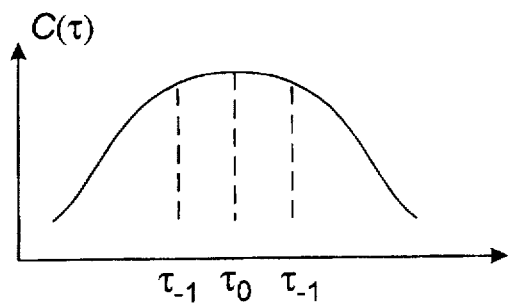
Figure 5F:
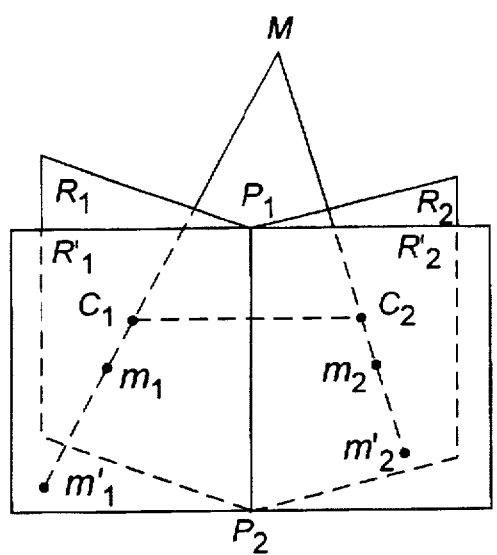
FIG. 5f illustrates a projection of a view into a third projection plane which is parallel to a line connecting a plurality of centers of projection.

FIG. 5e illustrates an expansion of a 3-D point into a rectangular region wherein $\tau_0$ is a peak correlation position and wherein a particular 2-D point is expanded into that rectangular region. In particular embodiments, before matching rectangular regions, each view is projected onto a third projection plane, the third projection plane being parallel to a line connecting the centers of projection. Turning to FIG. 5f, there is illustrated one projection of a view into a third projection plane which is parallel to a line connecting a plurality of centers of projection. Ideally, this common projection plane has a sampling grid most closely matching the two original projection planes. The similarity between these two rectangles is given by the following correlation function:

$$C_{12}(\tau) = \frac{1}{k} \sum_{u_1=-N}^{+N} \sum_{v_1=-P}^{+P} (I_1(u_1 + u_0, v_1 + v_0) - \overline{I_1(u_0, v_0)}) \; (I_2(u_1 + u_0 + \tau, v + v_0) - \overline{I_2(u_0 + \tau, v_0)})$$

wherein $C_{12}(\tau)$ is an uncertainty of stereo correspondence which is given for that region, and $$k=(2N+1)(2P+1)\sigma_1(u_0, v_0)\sigma_2(u_0+\tau, v_0).$$

In the foregoing formulas, $\tau$ represents a displacement along the epipolar line. $\overline{I_1(u_0, v_0)}$ and $\sigma_1(u_0, v_0)$ represent a mean intensity and standard deviation in image at point $(u_0, v_0)$, and wherein:

$$\overline{I_1(u_0, v_0)} = \frac{1}{(2N+1)(2P+1)} \sum_{u_1=-N}^{+N} \sum_{v_1=-P}^{+P} I_1(u_1 + u_0, v_1 + v_0),$$

and $$\sigma_1{}^2(u_0 + v_0) = \frac{1}{(2N+1)(2P+1)} \sum_{u_1=-N}^{+N} \sum_{v_1=-P}^{+P} (I_1(u_1 + u_0, v_1 + v_0) - \overline{I - 1(u_0, v_o)})^2$$

Similar formulas hold for $\overline{I_2(u_0+\tau, v_0)}$ and $\sigma_2(u_0+\tau, v_0)$. It should be noted that in response to the normalization by $\sigma_1$ and $\sigma_2$, $c_{12}$ preferably lies substantially between $-1$ and $+1$.

Returning to FIG. 5e, note an exemplary correlation curve wherein $\tau_0$ represents the peak correlation position between the image points within the 2-D projection planes. The correlation curve is preferably computed from a first projection plane to a second projection plane. The shape of these curves and the values of the correlation functions at the peaks provides the uncertainty of a stereo correspondence for that region of the scene. For example, the uncertainty may be given as follows:

$$x=1-C_{12}(\tau_0)+w[C_{12}(\tau_{-1})+C_{12}(\tau_{+1})],$$

wherein x is an uncertainty value and w is some predetermined weight, which is preferably less than one for the purposes of normalization. This uncertainty factor may be used, as will be shown momentarily, in refining the 3-D scene estimate.

Upon the occurrence of a match, processing system 100 uses the positions of the center of projection planes and the (u, v) coordinates of the rectangle centers to form a plurality of rays/vectors into 3-D world coordinates. The intersection of these rays defines the 3-D coordinate of the given surface point. Processing system 100 preferably repeats this process until all input projection planes have been analyzed.

The foregoing techniques are more fully disclosed in *Three Dimensional Computer Vision—A Geometric Viewpoint*, by Oliver Faugeras, MIT Press, Cambridge, Mass. (1993), which is incorporated herein by reference.

Processing system 100 stores the data representation of the 3-D scene estimate in a conventional suitably arranged storage device, such as memory storage device 207 of FIGS. 2 and 3, process block 404.

Processing system 100 then operates to identify the various objects and patterns making up a particular scene, process block 405. This is preferably accomplished by applying conventional data analysis techniques, such as matching for example, in conjunction with known information regarding different object and pattern classes. Given the 3-D estimate of a scene, known or a priori scene information may suitably be used to label various objects and/or patterns or regions, and as shall be discussed momentarily, to refine the 3-D scene estimate. A priori scene information, as used herein, is any scene information which is known prior to processing one or more current images of the captured scene. A priori scene information may therefore include without limitation, knowledge about 3-D structure, textures, lighting and motion of objects within the scene such as architecture/drawings, date and time of day, weather conditions, numbers and appearance of people, field and count maskings, light sources, past states of the scene, and the like. In accordance with particular embodiments of the present invention the 3-D scene estimate is analyzed to identify various objects and regions in the scene. The attributes of the various identified objects and regions are then preferably matched/compared against corresponding a priori attributes of known objects and regions.

The estimated 3-D scene is accordingly processed to identify a plurality of data sets within the raw scene input. Recall that the scene input includes a plurality of data points. Each one of the data sets preferably includes one or more of the data points. Each one of the various data sets preferably represents a particular foreground or background object or pattern within the scene. An object as used herein is anything that may be visually sensed and/or perceived, such as, the players in the illustrated tennis match of FIG. 1a or either of the two participants in the videophone call of FIG. 1b, for example. A pattern as used herein is a distinct part of a scene, such as, the background captured in a particular view of the scene. For example, the spectators in the grandstand or, the grandstand itself, in the illustrated tennis match, or the pattern/region captured behind either of the participants in the videophone call.

It is important to note that that which is an object in one scene may in point of fact be a pattern/region in the next scene, and vise versa. For example, the grandstand may be scanned to show the crowd with particularity in one scene, whereas the crowd may form the background in another scene which emphasizes the play between the tennis players. An important aspect of the present invention is the ability to distinguish between objects and 28 backgrounds, as was discussed with reference to process block 403.

Processing system 100 operates to generate one or more error values, process block 406. The errors may include without limitation, the geometric uncertainty of the correlation in data points between one or more camera views, errors in texture, lighting, and/or transparency, and errors in identification of one or more objects, regions and/or patterns.

The error value may be used to refine the 3-D scene estimate through any one of a number of conventional techniques including without limitation iterative processes such as those disclosed in *Three Dimensional Computer Vision—A Geometric Viewpoint*, which has previously been incorporated herein by reference.

Processing system 100 preferably ranks individual identified data points, which again include data sets or select groups thereof, by comparing same with one or more standard/normalized values, process block 407. The comparison preferably yields a ranking/value of importance. The standard values as used herein indicate visual significance and are indicative of which regions of the scene are of greatest interest to the viewer. For example, the audience is less important than the tennis players in a stadium (FIG. 1a) or the performers in a concert. Processing system 100 operates to re-store the processed standard values in a plurality of records of a memory storage device, process block 404.

Processing system 100 preferably combines the ranking/ importance value with the error value for a given region to indicate whether additional processing, possibly including masking, and the amount of additional processing to apply to the stored values, process block 409. For example, a low importance value and low error region would not require additional processing, a low importance value and high error region may only require masking, a high importance value and high error region may require further processing and a high importance value and low error region may only require further processing if surplus resources exist and further processing would improve the scene estimate.

Masking typically includes the application of a set of algorithms to modify the characteristics of a given data point. Examples of masking are the modification of lighting, the application of fog, and the replacement of a region with a pre-computed or prior view of that region, for example. The effects are applied to refine the 3-D scene estimate. Masking has the characteristic that its application will reduce the processing requirements necessary to model a specified portion of the 3-D scene, thereby allowing additional image processing resources to be applied to regions of relatively higher importance.

The sensitivity of the human vision system to detail is typically dependant on the average brightness. Assuming that a region of the 3-D scene estimate should be masked due to a high error estimation, then lowering scene illumination will reduce the perceived error. Errors that result in sharp edges may also be minimized by a simulated de-focusing or blurring of the region or by placing a fog, or semi-transparent material, between the view and the region in error. In case of scene estimation error, the particular region affected may be replaced with a pre-computed region, such as one or more of the spectators in the grandstand for example, or with a priori information of process block 408, such as a pre-computed radiance model.

If the importance value associated with the data points and/or sets is high and the associated error value exceeds a threshold value associated with the particular application, then particular ones of the data points associated with the data sets are preferably selectively processed to refine the 3-D surface shape and texture estimates. In other words, in correlating the data points between 2-D views, process block 402, additional sizes of rectangular regions are preferably used in stereo correspondence matches, wider search ranges are also preferably used, and a larger variety of geometric surfaces are fit to the structure point estimates in order to lower the error. The processing applied to reduce the estimation error may include, without limitation, filtering of the 3-D scene, scene interpolation, motion estimation, and/or the like.

Processing system 100 generates an enhanced 3-D scene estimate, process block 410. Such an estimate can be used to generate an arbitrary 2-D view suitable for display on a conventional display device, such as one or more of the televisions 107a–107m of FIG. 1a or the monitors of personal computers 100a, 100b of FIG. 1b. In alternate embodiments, the output signal may be recorded to a conventional storage device or medium for display at a later time. Alternatively, the generated scene estimate may suitably be used in conjunction with devices operative to a 3-D scene.

The techniques for generating the 2-D representation from the 3-D scene estimate include representations of 3-D polygons or voxels which are projected onto a projection plane through a pinhole camera model. Visibility is preferably calculated for each surface point using a z buffer algorithm, which is also known. In alternate embodiments, texture mapping, wherein a 2-D image is applied to a 3-D polygon may be used to provide additional realism. Lighting is also modelled with a variety of surface reflectance properties. One conventional exemplary technique for generating a 2-D image from a 3-D model is more fully disclosed in *Computer Graphics: Principles and Practice*, by J. D. Foley, A. van Dam, S. K. Feiner and J. F. Hughes, Addison-Wesley Pub. Co. (2nd ed. 1992), which is incorporated herein by reference.

Although the principles of the present invention have been illustrated in the context of the video capturing of a tennis match and the use of videophone technologies, their application may be implemented in connection with any scene/image processing and/or enhancing apparatus, system or methodology, including without limitation, surveillance and security systems, indoor and outdoor sports events, concerts, performances, speeches, scenic or historical site tours, virtual travel, museum tours and the like.

Although the present invention and its advantages have been described in detail, it should be understood that various changes, substitutions and alterations can be made herein without departing from the spirit and scope of the invention.

We claim:

1. An apparatus for generating an output signal representing a 3-D scene estimate, said apparatus comprising:

means for receiving at least one input signal representing a view of a scene, said view including a plurality of image points and said input signal including a plurality of data points, at least one of said data points including scene and importance information, wherein ones of said plurality of data points are representative of ones of said plurality of image points;

storage for storing said scene and importance information; and processing means for identifying a plurality of data sets wherein each one of said plurality of data sets includes ones of said plurality of data points, ranking one or more of said plurality of identified data sets using said stored scene and importance information, and in response to said ranking, enhancing selectively one or more of said plurality of identified output data sets to generate said output signal.

2. The apparatus as set forth in claim 1 wherein said processing means includes at least one processing unit.

3. The apparatus as set forth in claim 1 further including means for storing a plurality of processing system instructions for directing said processing means to process said input signal to produce said output signal representing said 3-D scene estimate.

4. The apparatus as set forth in claim 3 wherein said processing means is further operable to retrieve and execute selected ones of said plurality of processing system instructions.

5. The apparatus as set forth in claim 1 wherein said processing means further includes means for determining an error value for one or more of said plurality of data points.

6. The apparatus as set forth in claim 5 further including means for applying selectively one or more of a plurality of records of a priori scene information to one or more of said plurality of data points to reduce said error value.

7. The apparatus as set forth in claim 5 further including means for comparing selectively one or more of a plurality of records of ranking/importance data to said error value associated with one or more of said plurality of data points.

8. The apparatus as set forth in claim 5 further including means for determining ranking/importance data associated with one or more of said plurality of data points.

9. The apparatus as set forth in claim 1 wherein said input signal is received from a single video data capturing device and said apparatus further includes means for receiving additional information which includes at least one of a focal length value representing the focal length of one or more lenses of said single video device, an aperture value representing the aperture size of one ore more lenses of said single video device, and a shutter value representing the shutter speed of said single video device.

10. The apparatus as set forth in claim 9 further including means for utilizing selectively said additional information to estimate a 3-D scene.

11. The apparatus as set forth in claim 1 further including means for estimating a 3-D scene by selectively utilizing received positional data relating to at least one of size, shape, orientation, range of depth and texture of ones of said plurality of data sets.

12. A method for generating an output signal representing a 3-D scene estimate, said method comprising the steps of:
receiving a least one input signal representing a view of a scene, said view including a plurality of image points and said input signal including a plurality of data points, wherein ones of said plurality of data points are representative of ones of said plurality of image points, at least one of said data points including scene and importance information;

identifying a plurality of data sets wherein each one of said plurality of data sets includes ones of said plurality of data points; and comparing one or more of said plurality of identified data sets with one or more standard values, each of said identified data sets including at least one data point including scene and importance information, said scene and importance information being used to compare said identified data sets with said standard values and, in response to said comparison, enhancing selectively one or more of said plurality of identified data sets to generate said output signal.

13. The method as set forth in claim 12 wherein said comparing step further includes the step of determining an error value for one or more of said plurality of data points.

14. The method as set forth in claim 13 further including the step of applying selectively one or more of a plurality of records of a priori scene information to one or more of said plurality of data points to reduce said error value.

15. The method as set forth in claim 13 further includes the step of utilizing selectively said additional information to estimate a 3-D scene.

16. The method as set forth in claim 13 further including the step of determining ranking/importance data associated with one or more of said plurality of data points.

17. The method as set forth in claim 16 further including the step of comparing selectively one or more of a plurality of records of ranking/importance data to said error value associated with one or more of said plurality of data points.

18. The method as set forth in claim 12 wherein said input signal is produced by a single video data capturing device and said method further includes the step of receiving additional information which includes at least one of a focal length value representing the focal length of one or more lenses of said single video device, an aperture value representing the aperture size of one or more lenses of said single video device, and a shutter value representing the shutter speed of said single video device.

19. The method as set forth in claim 12 further including the step of estimating a 3-D scene by selectively utilizing received positional data relating to at least one of size, shape, orientation, range of depth and texture of ones of said plurality of data sets.

20. A method for generating an output signal representing a 3-D scene estimate, said method comprising the steps of:
receiving at least one input signal representing a view of a scene, said view including a plurality of image points and said input signal including a plurality of data points, wherein ones of said plurality of data points are representative of ones of said plurality of image points;

determining an error value for one or more of said plurality of data points;

determining ranking/importance data associated with one or more of said plurality of data points;

masking selectively ones of said plurality of data points when said ranking/importance data and said error value associated with one or more of said plurality of data points is relatively low and relatively high, respectively, to reduce said error value;

processing ones of said plurality of data points when said ranking/importance value and said error value associated with one or more of said plurality of data points are both relatively high to reduce said error value; and generating said output signal.

21. An apparatus for generating an output signal representing a 3-D scene estimate, said apparatus comprising:
means for receiving at least one input signal representing a view of a scene, said view including a plurality of image points and said input signal including a plurality of data points, wherein ones of said plurality of data points are representative of ones of said plurality of image points;

processing means for identifying a plurality of data sets wherein each one of said plurality of data sets includes ones of said plurality of data points, ranking one or more of said plurality of identified data sets, and in response to said ranking, enhancing selectively one or more of said plurality of identified data sets to generate said output signal, said processing means further including means for determining an error value for one or more of said plurality of data points, said error value associated with said plurality of data points being relatively high, said processing means further including means for masking selectively ones of said plurality of data points to reduce said error value; and means for determining ranking/importance data associated with one or more of said plurality of data points, said ranking/importance value associated with one or more of said plurality of data points being relatively low.

22. The apparatus as set forth in claim 21 further including means for retrieving visual masking data from a storage device.

23. An apparatus for generating an output signal representing a 3-D scene estimate, said apparatus comprising:

means for receiving at least one input signal representing a view of a scene, said view including a plurality of image points and said input signal including a plurality of data points, wherein ones of said plurality of data points are representative of ones of said plurality of image points;

processing means for identifying a plurality of data sets wherein each one of said plurality of data sets includes ones of said plurality of data points, ranking one or more of said plurality of identified data sets, and in response to said ranking, enhancing selectively one or more of said plurality of identified data sets to generate said output signal, said processing means further including means for determining an error value for one or more of said plurality of data points, said error value associated with one or more of said plurality of data points being relatively high, said processing means being operative to further process ones of said plurality of data points to reduce said error value; and means for determining ranking/importance data associated with one or more of said plurality of data points, said ranking/importance value associated with one or more of said plurality of data points being relatively high.

24. An apparatus for generating an output signal representing a 3-D scene estimate, said apparatus comprising:

means for receiving at least one input signal representing a view of a scene, said view including a plurality of image points and said input signal including a plurality of data points, wherein ones of said plurality of data points are representative of ones of said plurality of image points;

processing means for identifying a plurality of data sets wherein each one of said plurality of data sets includes ones of said plurality of data points, ranking one or more of said plurality of identified data sets, and in response to said ranking, enhancing selectively one or more of said plurality of identified data sets to generate said output signal, said processing means further including means for determining an error value for one or more of said plurality of data points, said error value associated with one or more of said plurality of data points being relatively low, said processing means being operative to further process ones of said plurality of data points to reduce said error value; and means for determining ranking/importance data associated with one or more of said plurality of data points.

25. A method for generating an output signal representing a 3-D scene estimate, said method comprising the steps of:

receiving at least one input signal representing a view of a scene, said view including a plurality of image points and said input signal including a plurality of data points, wherein ones of said plurality of data points are representative of ones of said plurality of image points;

identifying a plurality of data sets wherein each one of said plurality of data sets includes ones of said plurality of data points;

comparing one or more of said plurality of identified data sets with one or more standard values and, in response to said comparison, enhancing selectively one or more of said plurality of identified data sets to generate said output signal, said comparing step further including the step of determining an error value for one or more of said plurality of data points, said error value associated with one or more of said plurality of data points being relatively high;

determining ranking/importance data associated with one or more of said plurality of data points, said ranking/importance data associated with one or more of said plurality of data points being relatively low; and masking selectively ones of said plurality of data points to reduce said error value.

26. The method as set forth in claim 25 further including the step of retrieving visual masking data from a storage device.

27. A method for generating an output signal representing a 3-D scene estimate, said method comprising the steps of:

receiving at least one input signal representing a view of a scene, said view including a plurality of image points and said input signal including a plurality of data points, wherein ones of said plurality of data points are representative of ones of said plurality of image points;

identifying a plurality of data sets wherein each one of said plurality of data sets includes ones of said plurality of data points;

comparing one or more of said plurality of identified data sets with one or more standard values and, in response to said comparison, enhancing selectively one or more of said plurality of identified data sets to generate said output signal, said comparing step further including the step of determining an error value for one or more of said plurality of data points, said error value associated with one or more of said plurality of data points being relatively high;

determining ranking/importance data associated with one or more of said plurality of data points, said ranking/importance data associated with one or more of said plurality of data points being relatively high; and further processing ones of said plurality of data points to reduce said error value.

* * * * *